Jan. 13, 1959  H. C. HARBERS ET AL  2,868,583
DUMP TRUCK
Filed July 14, 1955  7 Sheets-Sheet 2
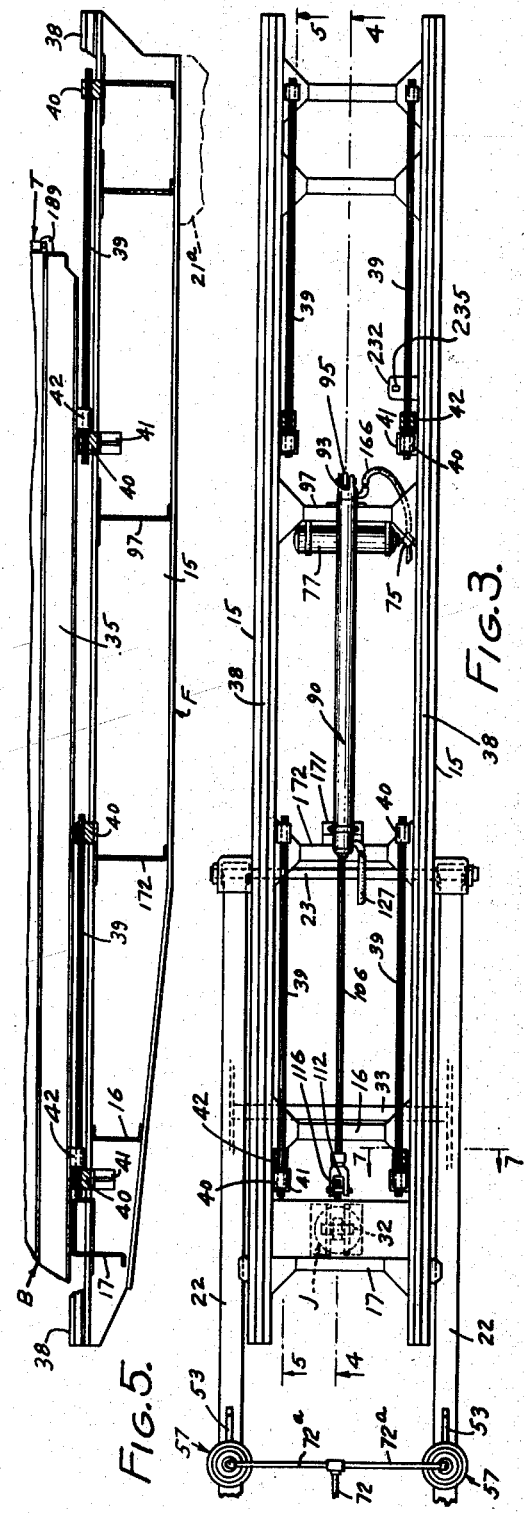
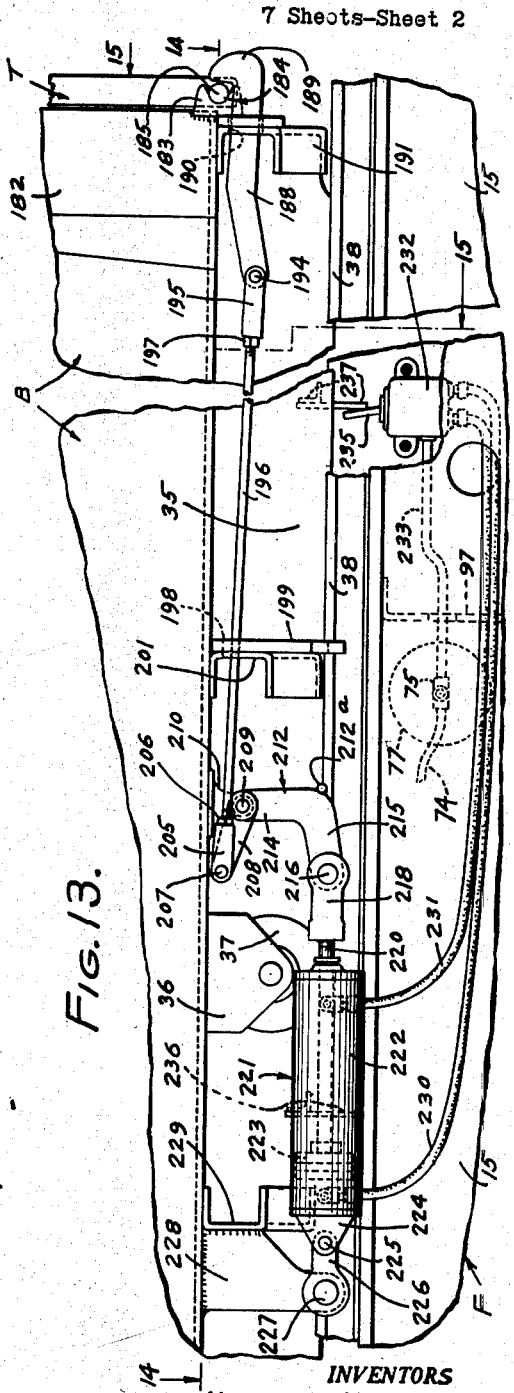
INVENTORS
HENRY C. HARBERS
BY DONALD R. MERCHANT
ATTORNEY

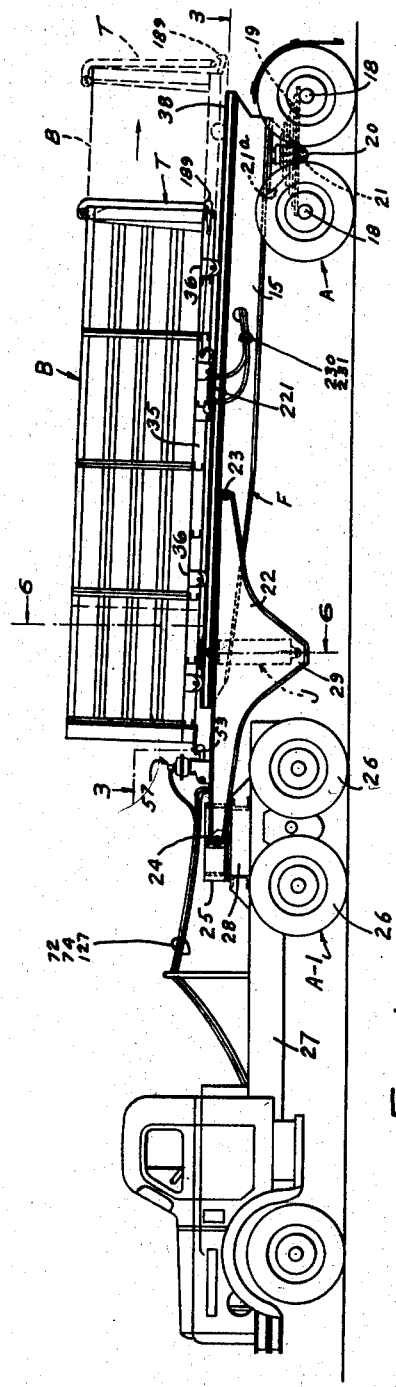

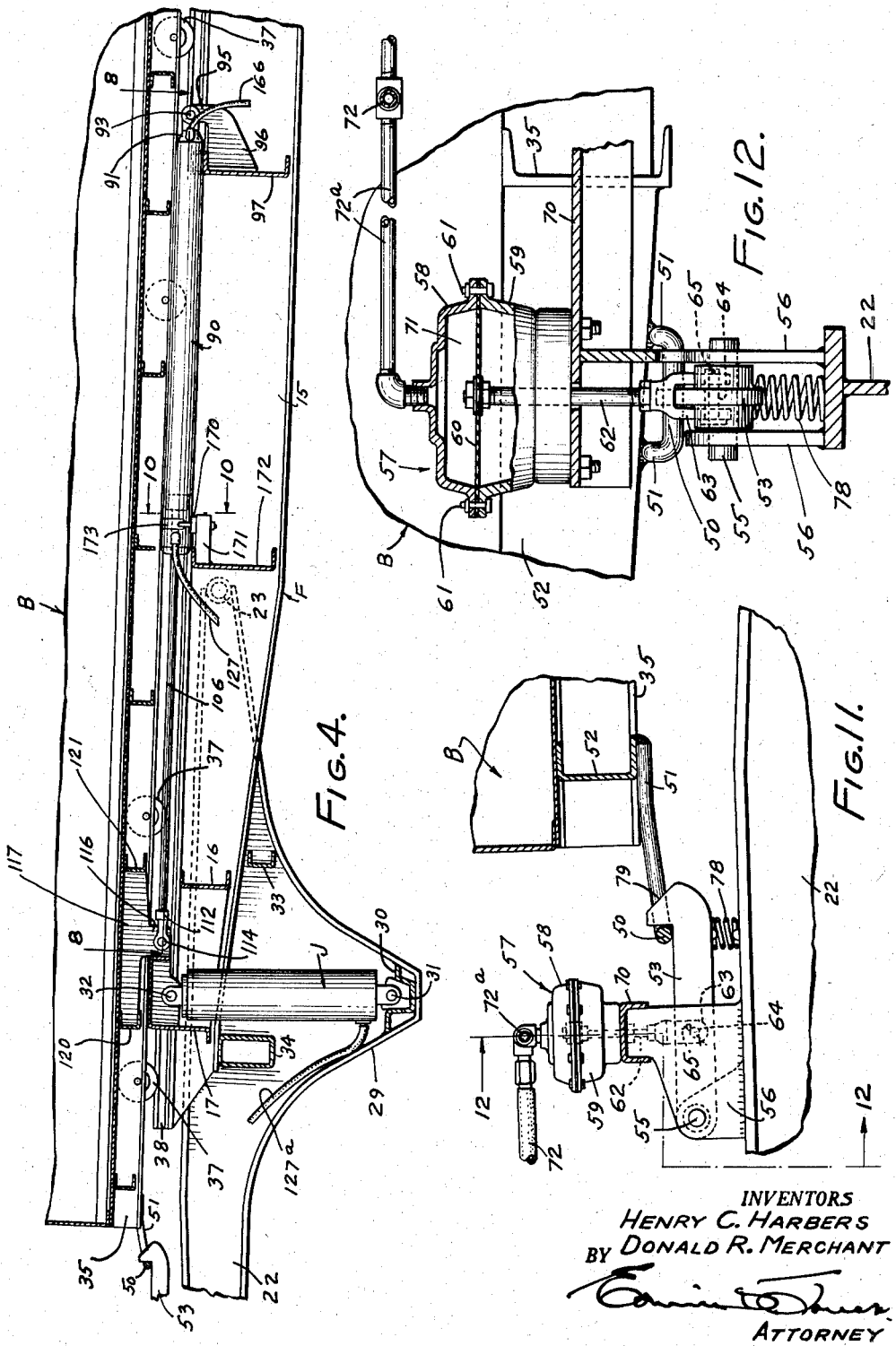

Jan. 13, 1959   H. C. HARBERS ET AL   2,868,583
DUMP TRUCK
Filed July 14, 1955   7 Sheets-Sheet 4

INVENTORS
HENRY C. HARBERS
BY DONALD R. MERCHANT

ATTORNEY

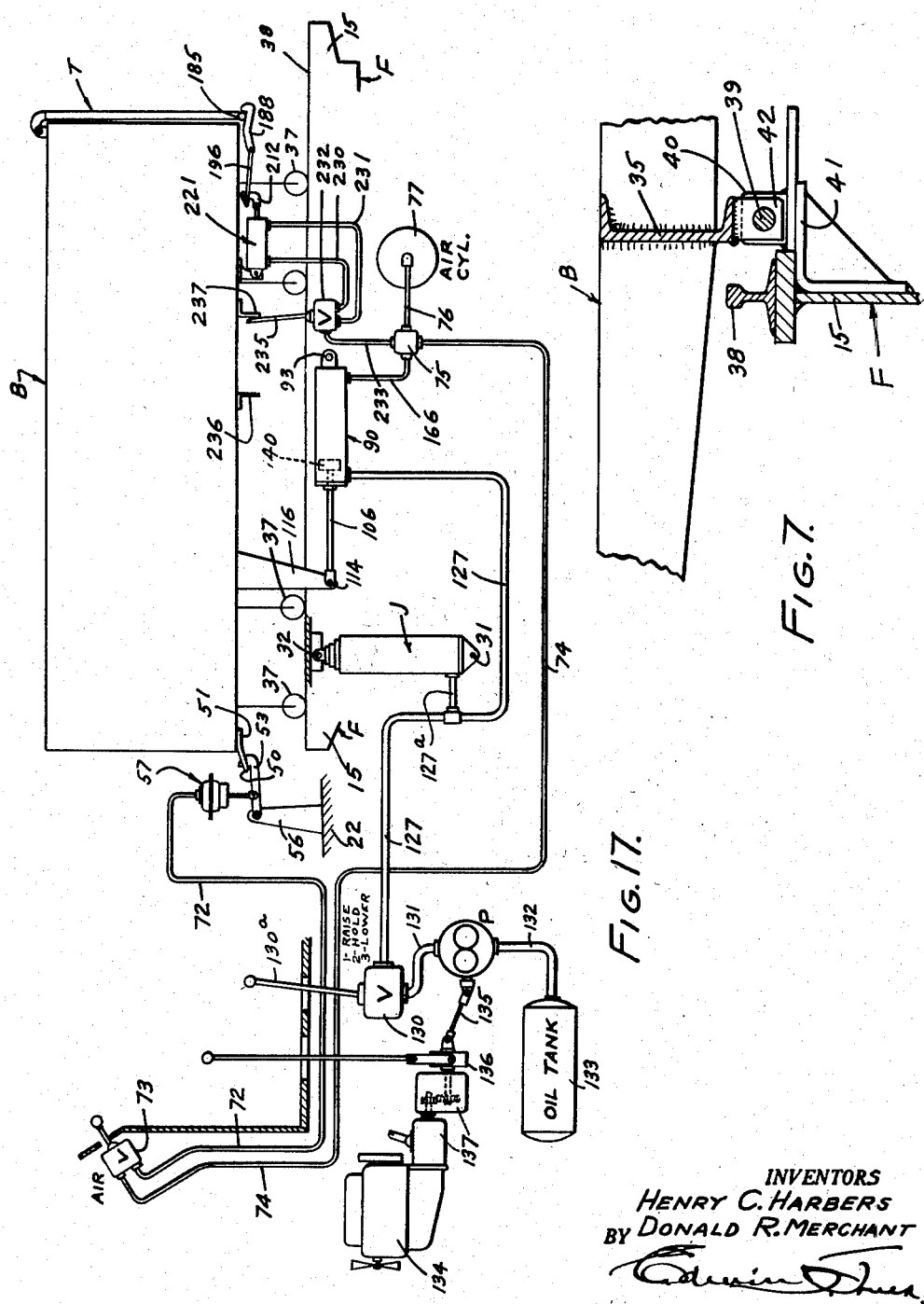

Jan. 13, 1959   H. C. HARBERS ET AL   2,868,583
DUMP TRUCK
Filed July 14, 1955   7 Sheets-Sheet 6
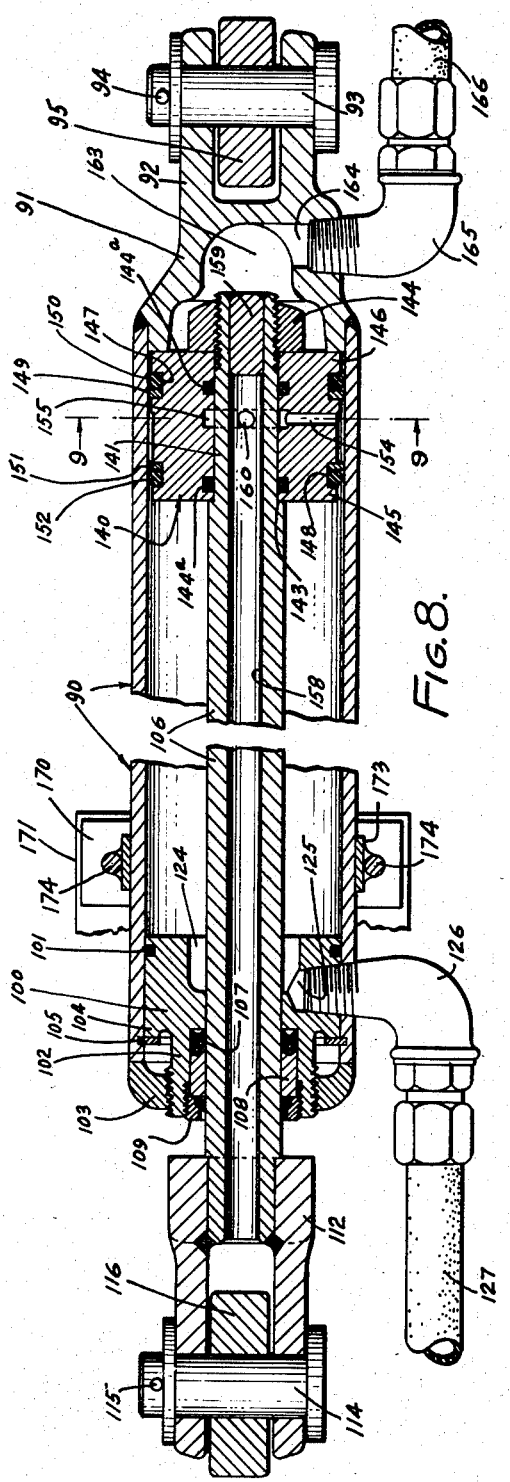
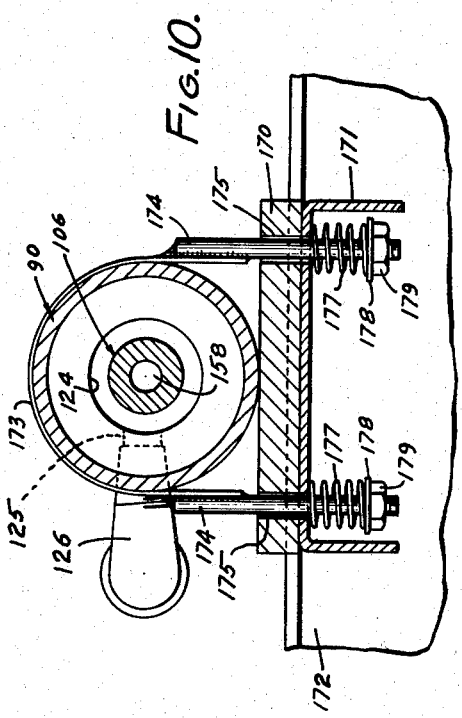
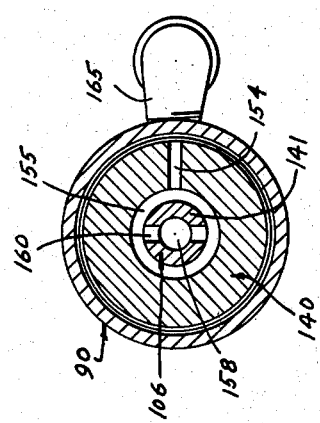
INVENTORS
HENRY C. HARBERS
BY DONALD R. MERCHANT
ATTORNEY

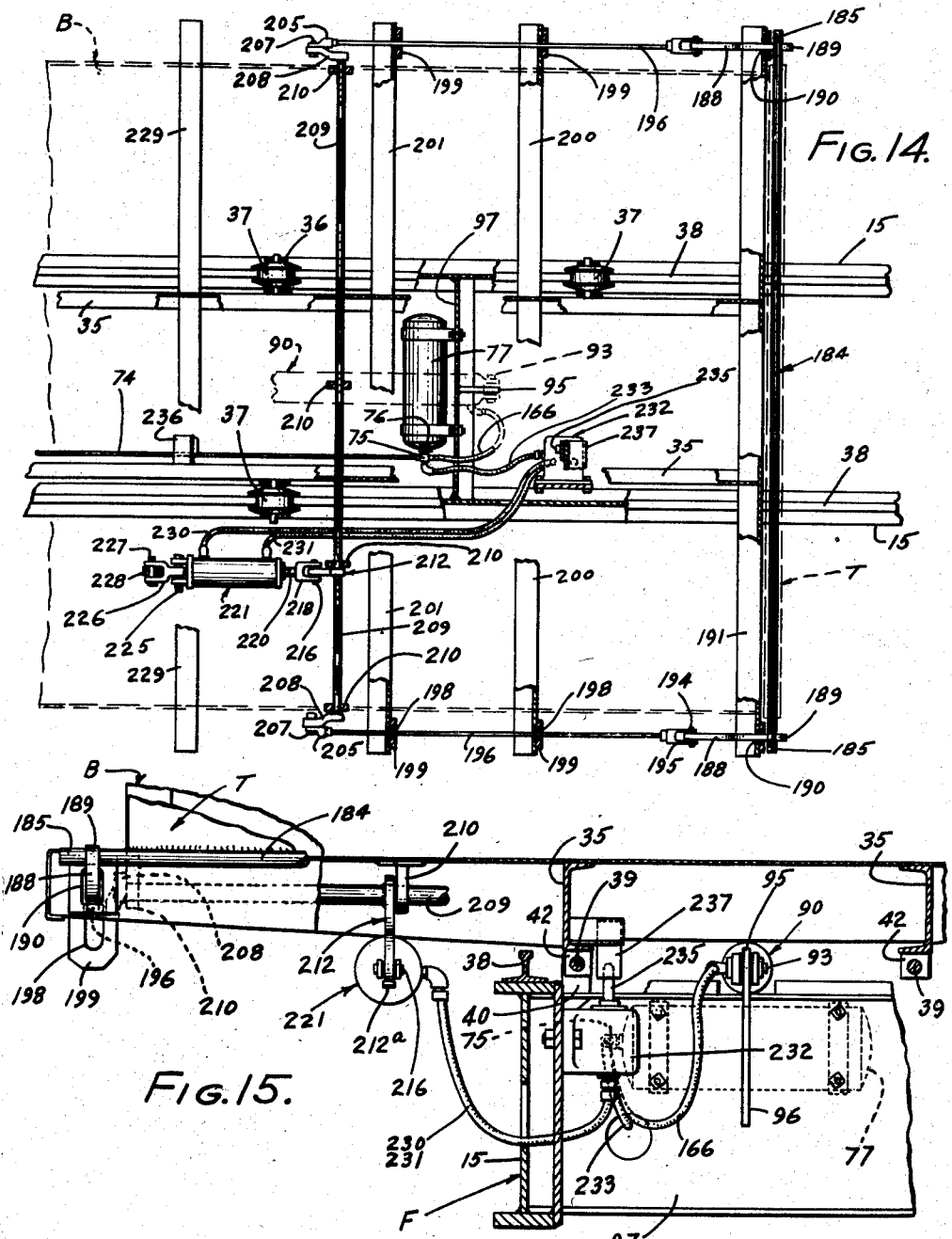

United States Patent Office 2,868,583
Patented Jan. 13, 1959

2,868,583

DUMP TRUCK

Henry C. Harbers, Pasadena, and Donald R. Merchant, Glendale, Calif., assignors to Cook Bros. Equipment Co., Los Angeles, Calif., a corporation of California Application July 14, 1955, Serial No. 521,972

15 Claims. (Cl. 298—15)

Our invention relates to dump trucks of the semi-trailer type, and of the character disclosed in our co-pending application Serial No. 455,718, filed September 13, 1954, now patent No. 2,815,980, wherein is embodied a power-driven vehicle including a front wheel assembly, a semi-trailer including a rear wheel assembly, a supporting frame separate from the front wheel assembly and mounted on the rear wheel assembly for upward and rearward swinging movement to a tilted position from a normal horizontal position, a dump body mounted for rolling movement longitudinally on the supporting frame to occupy a forward position on such frame when the latter is horizontal, and a rearward position on the frame to effect dumping of the body concurrently with and by tilting of the frame, and a hoisting mechanism comprising a plurality of hydraulic rams operable to so swing the supporting frame by effecting relatively approaching movement of the wheel assemblies.

In addition the aforesaid dump truck includes a tail gate for the dump body which, because of the manner of movement of the body in relation to tilting of the supporting frame could be released to open only as the body was nearing its full elevation, otherwise the load would spill on and around the rear axles.

It is a purpose of our present invention to provide a dump truck of this character in which the dump body is moved to rearward position in order to shift the center of gravity thereof rearwardly before swinging movement of the frame is initiated. This shifting of the center of gravity provides two outstanding advantages. One is that the amount of hydraulic pressure necessary to raise the dump body to dumping position is so greatly reduced as to require the use of only a single hydraulic ram. The other outstanding advantages is that the tail gate can be released as soon as the body is in the rear position and begins to raise, thus accelerating dumping of the body as well as to eliminate spilling of the load on and around the axles.

It is another purpose of our invention to provide mechanism of this character using pneumatic and hydraulic means for effecting the rearward and forward movement of the body and the raising and lowering thereof, no manual actuation of valves other than the hoist pump valve being required to make a complete dumping cycle.

Another purpose of the invention is to provide mechanism of this character having a single cylinder and piston for moving the body rearwardly and forwardly, hydraulic pressure being applied to one side of the piston and pneumatic pressure to the other side for operating the mechanism.

Still another purpose of our invention is to provide mechanism of this character having a novel arrangement of a bleed between the rings and the piston of the body rolling cylinder, into the hollow piston rod, so that oil cannot pass into the air system, nor air pass the piston ring into the hydraulic oil lines.

It is a further purpose of the invention to provide mechanism of this character wherein the oil on one side of the piston keeps the entire piston lubricated.

Another purpose of the invention is to provide mechanism of this character which greatly reduces the raising and lowering cycle time so that the unit is very rapid, reducing not only operating time but operating expense, and making it possible to haul more loads in a given time.

Still another purpose of the invention is to provide automatically operated tripping and closing means for the tail gate, the tail gate being opened when the body reaches the rearmost position, and when the body is moved to its forward position the tail gate is automatically locked in the closed position.

A further purpose of the invention is to provide means for locking the body in the forward position to prevent rolling or floating rearwardly and forwardly of the body when the truck is in motion.

Another purpose of the invention is to provide improved sliding body hold-down means.

The characteristics and advantages of the invention are further sufficiently referred to in connection with the following detailed description of the accompanying drawings which represent one embodiment. After considering this example, skilled persons will understand that many variations may be made without departing from the principle disclosed, and we contemplate the employment of any structures, arrangements, or modes of operation that are properly within the scope of the appended claims.

Referring to the accompanying drawings:

Fig. 1 is a view showing a side elevation of one form of dump truck embodying the present invention wherein the dump body is in the load-carrying position.

Fig. 2 is a similar view of the same showing the dump truck in dumping position.

Fig. 3 is an enlarged plan view of the tilt frame taken on line 3—3 of Fig. 1.

Fig. 4 is an enlarged view partially in section, taken on line 4—4 of Fig. 3 showing the mechanism for moving the body rearwardly and forwardly and for tilting said body.

Fig. 5 is an enlarged sectional view taken on line 5—5 of Fig. 3.

Fig. 7 is an enlarged sectional view taken on line 7—7 of Fig. 3 showing one of the rails on which the body rolls, and the body hold-down means.

Fig. 8 is an enlarged sectional view taken on line 8—8 of Fig. 4 showing the interior construction of the cylinder and piston assembly for moving the body rearwardly and forwardly.

Fig. 9 is a sectional view taken on the line 9—9 of Fig. 8.

Fig. 10 is an enlarged sectional view taken on line 10—10 of Fig. 4.

Fig. 11 is an enlarged side view showing the body locking and release mechanism.

Fig. 12 is an enlarged sectional view taken on line 12—12 of Fig. 11.

Fig. 13 is an enlarged side view of the locking mechanism for the end gate, the mechanism being in the locked or latched position.

Fig. 14 is a view partially in section, taken on the line 14—14 of Fig. 13.

Fig. 15 is a view partially in section, taken on line 15—15 of Fig. 13.

Fig. 17 is a schematic view showing the hydraulic and pneumatic systems.

Figure 6:
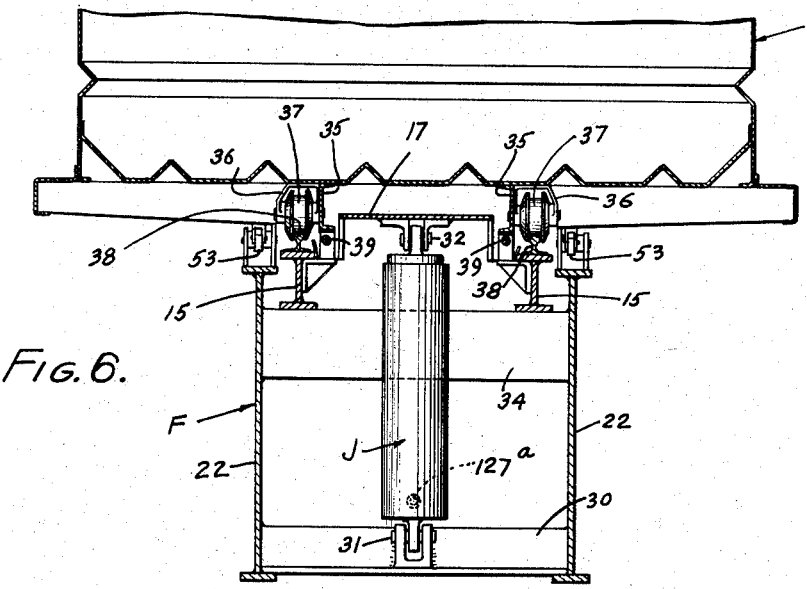
Fig. 6 is an enlarged sectional view taken on line 6—6 of Fig. 1 showing the hydraulic mechanism for tilting the body.

Referring more particularly to the drawings, the dump truck comprises a rigid frame F including parallel side beams 15 connected together at longitudinally spaced points by cross beams 16, and adjacent their forward ends by an additional cross beam 17 of substantially S-form in cross section. Adjacent its rear end the frame F is supported by a rear wheel assembly A which is of the tandem axle type, the two axles 18 of which support the ends of springs 19, with the springs carrying depending bearings 20 in which trunnions 21 are mounted. The trunnions are fixed to members 21a secured to the undersides of the beams 15. This arrangement of elements provides pivotal connection between the frame and the rear wheel assembly so that the frame may tilt upwardly and rearwardly about the trunnions 21 as a center.

Constituting a draft and lifting means for the frame F are a pair of heavy duty links 22 which are pivoted at their rear ends on a shaft 23 extending across the side beams 15 between the ends thereof. These links are disposed adjacent but outwardly of the side beams 15, and project forwardly beyond the forward end of such beams. At their forward ends the links 22 are pivoted on trunnions 24 which project from opposite sides of a conventional form of fifth wheel 25 supported by a front wheel assembly A–1 which includes tandem axle rear wheels 26, side frames 27 and a cross plate 28. This front wheel assembly is preferably the rear portion of a self-powered vehicle commonly used in connection with semi-trailers such as is formed by the rear wheel assembly A and the frame F.

The links 22 between the ends thereof, are formed with depending extensions 29 which constitute walls connected at the bottoms thereof by a cross beam 30. To this cross beam a hydraulic jack J of the multiple telescopic type is pivoted at the lower ends thereof as at 31, while the upper end thereof is pivotally connected as at 32 to the cross beam 17. This jack constitutes means for hoisting one end of the frame F from the load carrying position of Fig. 1 to the elevated or dump position shown in Fig. 2, as will be more completely described hereinafter. It is to be understood, of course, that other means than the jack could be used for the purpose of elevating the end of frame F.

The draft links 22 are additionally rigidly connected one to the other by cross beams 33, and a box beam 34 upon which latter the forward ends of the side beams 15 rest when the frame F is in the lowered position shown in Fig. 1.

Supported for rolling movement longitudinally on the frame F is a dump body B which includes a pair of parallel beams 35 fixed to the under side of the bottom of the body. To the beams 35 frames 36 are secured at spaced intervals along the length thereof, and in each of which is journalled a flanged roller 37. These rollers are movable on a track made up of a pair of rails 38 fixed to the top of the side beams 15 and coextensive in length therewith.

Sliding body hold-down means, best shown in Figs. 3, 5, 6, 7 and 15, is provided and comprises front and rear sets of rods 39, each set being arranged parallel to each other and having the ends thereof secured in brackets 40 which are in turn secured to support members 41 which are attached to the frame members 15. Brackets 42 are secured to the under side of the beams 35 by welding or the like, and have openings therein for reception of the rods 39 in sliding relationship. Thus the rollers 37 are confined to rolling movement on the rails 38, it being understood that the rods and brackets are so arranged and spaced as to permit full rolling movement of the body B between its rearmost position and its forwardmost position.

There is means at each side for securing the body in the fore or forwardmost position on the tilt frame, and this means is shown in Figs. 1, 2, 11, 12 and 17. Each of the body securing means is the same and hence only one will be described. Each of said means includes a fixed member of generally U-shape having a transverse rod 50 and end portions 51 secured to a cross frame member 52 at the forward end of the body. The rod 50 is adapted to be engaged by a hook 53 of the latching mechanism, the hook being pivoted at 55 in supporting ears 56 secured to the top of the respective link 22.

The hook 53 is adapted to be actuated by pneumatic means, indicated generally at 57, and comprises a pneumatic actuator formed of a pair of hollow shells 58 and 59 between which is marginally clamped a diaphragm 60. The members 58 and 59 are secured together by bolts 61 through the flanges of the members 58 and 59. The diaphragm 60 is connected to the hook 53 by means of a rod 62 which has its upper end attached to said diaphragm and which carries a yoke 63 at its lower end.

The side arms of the yoke 63 have aligned openings therethrough for reception of a pin 64 which also passes through an opening provided therefor in the hook 53. Any suitable means, such as a cotter pin 65, may be used to retain the pin 64 in position. It is to be noted that the connection between the diaphragm 60 and hook 53 is intermediate the ends of the hook, and that downward movement of the hook effects release of the body.

The lower member 59 is secured to a support member 70 welded or otherwise suitably secured to the respective link 22. The diaphragm 60 and member 58 define a pressure chamber 71 and the pressure chambers are connected by conduits 72a with a conduit 72 which is connected with a manually operable air valve 73 that is located at any convenient position for actuation by the operator of the truck. The air valve 73 is also connected by a conduit 74 with a coupling 75 having a connection 76 with a source of air pressure shown as a tank 77. The latter may be supplied with air under pressure from any suitable source, not shown.

When the air valve 73 is actuated to admit pressure to the chamber 71 diaphragm 60 is moved downwardly to effect release of the latch or hook from the bar 50. A spring 78 urges the latch or hook 63 into the latching position, the spring then being fully expanded. It is to be noted that the forward face 79 of the hook 63 is so inclined that when the hook is in the latching position the face 79 may be engaged by the rod 50 to effect downward movement of the hook to a position whereat its hooking end passes the rod 50 and returns to the latching position so as to prevent the body from moving rearwardly.

Means for moving the body between the fore and aft positions on the rails is shown in Figs. 3, 4, 8, 9, 10, 13 and 17. This means includes a cylinder 90, the rear end of which is provided with an end member 91 terminating at the free end thereof in a yoke 92 having aligned openings therein for reception of a pivot pin 93 held in position by any suitable means such as a cotter pin 94. An ear 95, operably disposed between the arms of the yoke, is provided with an opening in which the pin 93 is received. Ear 95 extends upwardly from an arm 96 secured to a cross member 97 between the beams 15 by welding or other suitable means. Thus the rear end of the cylinder is pivotally secured to the tilt frame.

The forward end of the cylinder 90 has a head 100 with an annular seal 101 adjacent the inner end. The outer end of the head 100 is provided with a reduced diameter externally threaded sleeve 102 which extends forwardly and is threadably received in an internally threaded axial opening of a nut 103 which tightly draws an annular portion 104 of the head against a snap ring 105 received within a groove provided therefor in the cylinder wall adjacent the forward end of said cylinder.

The head 100 is also provided with an axial opening in which is slidably received a piston rod 106, and packing means of any suitable character provides a seal for the piston rod, the seal including packing 107, a ring 108, and a nut 109 within the sleeve 102, the nut 109 being externally threaded and screwed into the internally threaded end of the sleeve 102.

The front end of the piston rod 106 has a clevis 112 secured thereto by welding or the like. Aligned openings are provided in the arms of the clevis for reception of a pivot pin 114 secured in the clevis by a cotter pin 115 or other suitable means. Between the clevis arms a part 116 of a bracket 117 is received, part 116 having an opening therein for reception of the pin 115. A bracket 117 is secured to cross members 120 and 121 between the side beam 35 of the body B. Thus the front end of the piston rod is pivotally connected to the body.

Head 100 is provided with an axial recess 124 in its inner end that has a tapped radial passage 125 aligned with an opening in the wall of cylinder 90 so as to receive a fitting 126 connected with a conduit 127 which leads to a three-position valve 130 of known character, the valve positions being "raise," "hold" and "lower." Valve 130 is connected by a conduit 131 with a discharge side of a pump P which has its inlet side connected by a pipe 132 with a reservoir 133 for hydraulic liquid such as oil or the like. Pump P is driven by any suitable means. As shown, the pump driving means is the engine 134 of the truck. There is a flexible connection 135 between the pump P and a clutch 136 connected with the transmission 137 of the truck, the transmission being operably connected with the engine 134.

The rear end of the piston rod 106 has a piston 140 with an axial opening therethrough receiving a reduced diameter portion 141 of the rod 106, the inner end of the piston abutting the shoulder 143 at the inner end of the portion. The free end of the reduced diameter portion 141 is threaded for reception of a nut 144 whereby the piston is secured on the rod. Seals 144a in grooves provided therefor in the piston provide a seal between the piston and portion 141 of said rod 106.

The piston 140 is of substantially smaller outside diameter than the inside diameter of the cylinder 90 and the inner end portion 145 of the piston is smaller than the outer end portion 146. Externally the piston has an annular groove 147 in the outer end portion 146 and an annular groove 148 in the inner end portion. Groove 147 has a piston ring 149 and a sealing ring 150, while the groove 148 has a piston ring 151 and a sealing ring 152. Between the grooves 147 and 148 there is a radial passage 154 extending from the exterior of the piston to an internal annular groove 155.

Piston rod 106 has a longitudinal passage 158 therethrough closed at the rear end by a plug 159 secured in said passage by any suitable means such as, for example, welding or the like. A cross bore 160 in the reduced diameter portion 141 of the piston rod provides communication between the grooves 155 and the interior passage 158 of the piston rod 106. Member 91 is internally recessed at 163, the recess being connected with the exterior of said member 91 by a passage 164 in which is threadably received a fitting 165, the latter being in turn connected with a conduit 166 leading to the coupling 75 so as to connect the rear end of the cylinder 90 with air under pressure.

Hydraulic pressure is applied to the forward end of the piston 140 to move same rearwardly in the cylinder, and pneumatic pressure is applied to the rear end of the piston for moving same forwardly. Any hydraulic fluid which may pass the piston seal 152 and ring 151 will flow into the passage 154, annular groove 155, cross bore 160 and into the passage 158 of the piston rod from which it may escape to atmosphere at the forward open end of the rod. Air, which may pass the seal 150 and the piston ring 149, will also flow into the passage 154 and through the above-described path so that it may also escape from passage 158 to atmosphere.

The forward end of the cylinder 90 is resiliently held down on a block 170 secured to a supporting member 171 by any suitable means, the latter being secured by welding or the like to a cross member 172 between the beams 15 of the tilt frame. There is a strap 173 having bolts 174 secured to the ends thereof by welding or the like. Bolts 174 extend downwardly through openings 175 provided therefor in the block 170 and member 171. The free end of the bolts have springs 177 disposed thereabout, and these springs react between the member 171 and washers 178 secured on the bolts by nuts 179.

The dump body B is provided at its rear end with a tail gate T pivoted at its upper end on pivots 180 of brackets 181, the latter being secured to members 182 of the body B. Means is provided for releasably latching the gate T in the closed position, such means being shown in Figs. 1, 2, 13, 14, 15 and 16. At the bottom of the gate T a transverse rod 184 is secured, the rod having end parts 185 adapted to be secured in the notches of keepers 183 fixed to the end of the body B. There is a latch hook 188 for each end 185, and each hook is provided with a hook end 189 which is adapted to engage the receptive end parts 185.

Hooks 188 are slidable longitudinally in suitable slots 190 in the end beam 191 of the dump body so that the hooks project to the rear sides thereof for movement into and out of engagement with the end parts 185. The hooks are obtusely angled and have their inner ends pivotally connected at 194 to yokes 195 adjustably screwed to the adjacent threaded ends of latch rods 196, the yoke being held in adjusted position by nuts 197.

Rods 196 are operably received in slots 198 in plates 199 and cross beams 200 and 201 of the body to which the plates are attached. The forward end of the rods 196 are provided with yokes 205 screwed onto the forward threaded ends of the rods and locked thereon by nuts 206. The yokes are pivotally secured at 207 to the free ends of levers 208 secured to a transverse actuating shaft 209, levers 208 extending forwardly and somewhat upwardly when the latch mechanism is in the latching position.

Shaft 209 is rotatable in supports 210 secured by any suitable well-known means, such as welding, to the under side of the body. The levers 208 are located adjacent the ends of the shaft 209 and between said levers is an elbow-shaped lever indicated generally at 212, having a portion 214 with one end fixed to the shaft. The portion 214 depends from the shaft and there is a forwardly and slightly downwardly inclined portion 215. The lever 212 is in the above-described position when the latching mechanism is in the latching position.

The free end of portion 215 is pivoted at 216 to a yoke 218 secured to the piston rod 220 of a pneumatic actuator indicated generally at 221. Actuator 221 includes a cylinder 222 in which is operably disposed a piston 223. At the forward end of cylinder 222 is an ear 224 pivoted at 225 to one end of a link 226, the opposite end of the link being pivoted at 227 to a support 228 attached to a cross member 229 of the body B. Cylinder 222 is connected front and rear by flexible conduits such as rubber hoses 230 and 231, with a valve 232 attached to the adjacent tilt frame member 15, and which in turn has a connection 233 with the coupling 75.

The flexible hoses 230 and 231 are used to accommodate movement of the actuator 221 which is carried by the body and moves forwardly and rearwardly with said body. The valve 232 may be of any well-known type having two positions for supplying air to either the front or the rear of the cylinder 222. A valve actuating lever 235 extends upwardly from the valve and an upper end portion of the lever 235 lies in the path of a pair of angle members 236 and 237 attached to the adjacent beam 35 of the body B, respectively forwardly and rearwardly of said lever 235.

When the body B approaches the foremost position, member 237 engages lever 235, and when the body has reached the foremost position lever 235 has been moved to a position where the valve 232 provides compressed air to the rear end of cylinder 222 causing piston 223 to move forwardly and position hook 188 in the latching position shown in Figs. 1 and 13. When the body is moved rearwardly and approaches the rearmost position member 236 engages lever 235, and when said body has reached the rearmost position lever 235 has been moved to a position whereat the valve 232 provides compressed air to the front end of the cylinder 222 causing piston 223 to move rearwardly.

Figure 16:
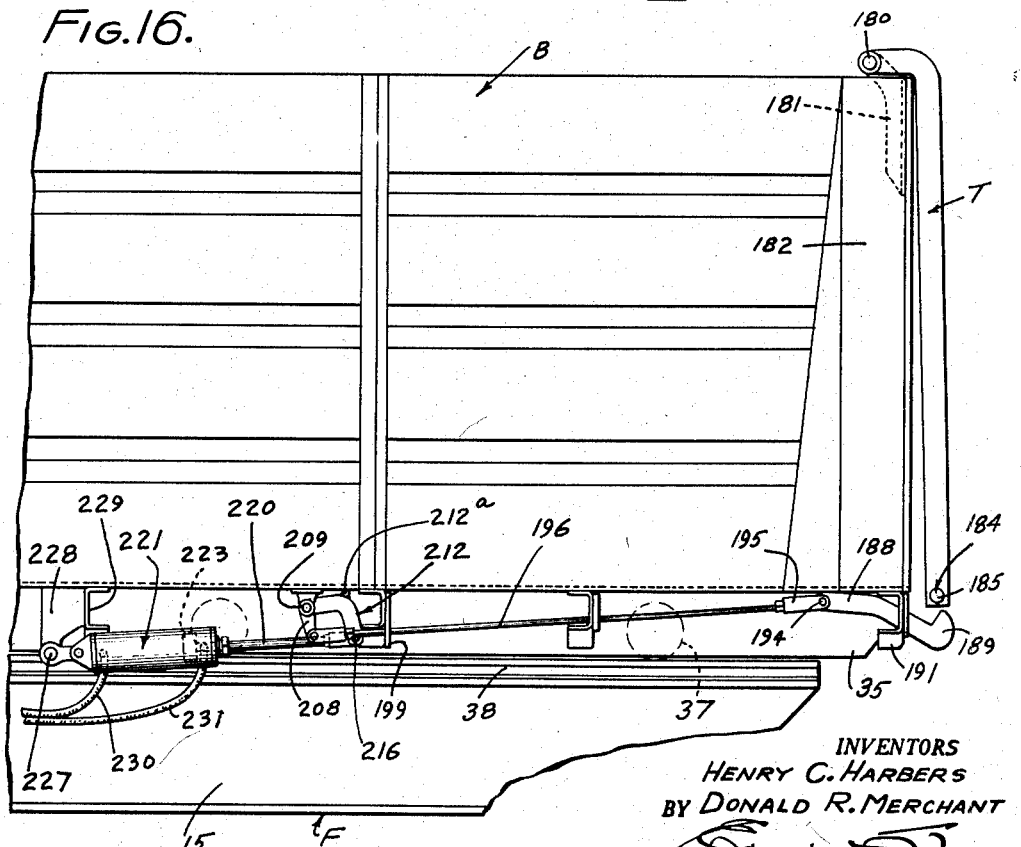
Fig. 16 is an enlarged side view showing the locking mechanism for the end gate, the mechanism being in the unlatched position.

This movement effects actuation of lever 212, rod 209, lever 207, rod 196 and hooks 188 so that the latter are moved to the release position shown in Figs. 2 and 16. Lever 212 is provided with an abutment member 212a adapted to engage a convenient fixed part, such as the under side of the body, to limit counterclockwise movement, as viewed in Figs. 13 and 16, effected by the actuator 221 when operating to effect release of the tail gate T.

The truck is shown in Fig. 1 in the load-carrying position, the body B occupying the forwardmost position on the frame F where it is held against movement by the latch hooks 53. The tail gate T is secured in the closed position by the latch hooks 188.

To dump the load from the body B the lever 73a of the valve 73 is actuated to supply air pressure to the actuators 57 which thereupon move hooks 53 downwardly so the body B may be moved rearwardly. Rearward movement of the body is effected by positioning the handle 130a of the hydraulic valve 130 to the RAISE position after clutch 135 is engaged so the pump P is operated by the motor or engine 134. By thus positioning the valve 130 hydraulic pressure is supplied to the forward end of the cylinder 90, and at the same time hydraulic pressure is also supplied to the jack J from the conduit 127 by way of the conduit 127a.

Hydraulic pressure delivered to the forward end of the cylinder 90 urges the piston 140 rearwardly against pneumatic pressure which is applied to the rear end of the piston. This hydraulic pressure is higher than the pneumatic pressure so that the piston 140 is moved to the rear end of the cylinder 90. Such movement of the piston effects movement of the body B to the aft position, the pneumatic pressure at the rear of the piston 140 serving to cushion the movement of said piston.

While the hydraulic pressure is sufficient to effect rearward movement of piston 140 and body B, this pressure is insufficient to effect raising of the tilt frame F and loaded body B until the body has reached or substantially reached its rearmost position. The shift in the center of gravity of the body to the rear reduces the effective weight the jack J must lift and permits lifting of the frame F and body B with a comparatively small amount of pressure.

The above described tilting of the frame F and body B is automatic when the body reaches its aft position and causes the rear wheel assembly A of the trailer and the wheel assembly A1 of the truck to move together relative to each other so that the parts are in the dumping position shown in Fig. 2. When the body B approaches its rearmost position the member 236 engages lever 235 and when the body reaches the rearmost position valve 232 has been actuated to supply pneumatic pressure to the actuator 221 to automatically effect disengagement of the latch hooks 188 from the parts 185 of the rod 184 to thereby effect unlatching of the tail gate T so that it opens with tilting of the frame F and body B and permits dumping of the material in the body.

It is to be understood that when the jack J has raised the frame F and body B to the uppermost position the operator moves the lever 130a of the valve 130 to the "hold" position and leaves it there until the load has been dumped.

After the material in the body B has been dumped the lever 130a is moved to the "lower" position to relieve the jack of hydraulic pressure and permit the tilt frame F and body B to return by gravity to the load-carrying position, oil in the hydraulic system returning to the tank 133 through the conduits 127a, 127, valve 130, conduit 131, pump P and conduit 132. This release of the hydraulic pressure also relieves the forward end of the piston 140 of the cylinder 90 of pressure, so that when the tilt frame and body have returned to load-carrying position the body is automatically moved to the fore position, pneumatic pressure on the rear end of the piston 140 actuating the piston which, in turn, moves the body forwardly to the fore position where it is automatically latched by the hooks 53. As the body B approaches its fore position the member 237 engages lever 235, and when the body reaches such position the valve 232 is actuated to provide pressure to the actuator 221 to effect latching of the gate T. Thus the gate is automatically latched when the body reaches its fore position.

What we claim is:

1. A dump truck, including: a front wheel assembly; a rear wheel assembly; a tilt frame separate from the front wheel assembly and pivoted on the rear wheel assembly for vertical tilting movement from a substantially horizontal position to a downwardly and rearwardly inclined position; draft means connecting the front wheel assembly to the frame; tilting mechanism connected between the frame and the draft means, and arranged to exert a lifting force on the frame thereby causing operation of the draft means to produce relative approaching movement of said wheel assemblies whereby the frame is swung to said inclined position; a dump body supported for movement longitudinally on the frame to occupy a fore position and an aft position; body moving means including actuator means, for moving the body between said fore and aft positions, said means being connected between the tilt frame and said body; and manually initiated pressure-fluid means for automatically actuating tilting mechanism and body moving means so that when the tilt frame is horizontal the body will be moved to the aft position before the tilting mechanism raises said frame and body.

2. A dump truck, including: a front wheel assembly; a rear wheel assembly; a tilt frame separate from the front wheel assembly and pivoted on the rear wheel assembly for vertical tilting movement from a substantially horizontal position to a downwardly and rearwardly inclined position; draft means connecting the front wheel assembly to the frame; tilting mechanism connected between the frame and the draft means, and arranged to exert a lifting force on the frame thereby causing operation of the draft means to produce relative approaching movement of said wheel assemblies whereby the frame is swung to said inclined position; a dump body supported for movement longitudinally on the frame to occupy a fore position and an aft position; actuator means for moving the body between said fore and aft positions, said means being connected between the tilt frame and said body; means for controlling said tilting mechanism and actuator means so that when the tilt frame is horizontal the body will be moved to the aft position before the tilting mechanism raises said frame and body; and releasable latching means for latching the body in the foremost position.

3. In a dump truck: a front wheel assembly; a rear wheel assembly; a tilt frame connected to the front wheel assembly and adapted to be tilted on the rear wheel assembly to a position whereat said frame is inclined downwardly and rearwardly; tilting mechanism connected to said frame to effect tilting thereof to said inclined position; a dump body supported for movement longitudinally on said frame between a fore and an aft position; actuator means for moving the body on the frame between said fore and aft positions; means for automatically controlling the tilting mechanism and actuator means so that the body will be moved to the aft position before the tilting mechanism effects tilting of the frame and body to said downwardly and rearwardly inclined position; and means for releasably latching the body in the fore position.

4. In a dump truck: a front wheel assembly; a rear wheel assembly; a tilt frame connected to the front wheel assembly and adapted to be tilted on the rear wheel assembly to a position whereat the frame is inclined downwardly and rearwardly; fluid pressure actuated tilting mechanism connected to the frame to effect tilting thereof to said inclined position; a dump body longitudinally movable on the frame between a fore and aft position, said body having a tail gate pivoted adjacent the upper end thereof; actuator means for moving the body on the frame between said fore and aft positions; means for supplying fluid actuating pressure to the tilting mechanism and actuator means so that the body will be moved to the aft position before the tilting mechanism effects tilting of the frame and body to said downwardly and rearwardly inclined position; means for controlling said supply of actuating fluid pressure; automatic means for releasably latching the tail gate in the closed position, said automatic means releasing the tail gate when the body has moved to the aft position and latching said tail gate when the body has been moved to the fore position; and means for releasably latching the body in the fore position, said means being adapted to automatically latch said body in said fore position when the body has been moved thereto.

5. A dump truck, including: a front wheel assembly; a rear wheel assembly; a tilt frame separate from the front wheel assembly and having the rear end pivoted on the rear wheel assembly, the front end of said frame being adapted for upward tilting movement to a position whereat said frame is downwardly and rearwardly inclined; draft means connecting the frame to the front wheel assembly; hydraulic tilting mechanism connected between the frame and the draft means and arranged to exert a lifting force on the frame thereby causing operation of the draft means to effect relative approaching movement of said wheel assemblies whereby the frame is tilted to said inclined position; a dump body supported for movement longitudinally on the frame; hydraulic and pneumatic actuating means for moving said body rearwardly and forwardly respective to the aft and fore positions; respective means for supplying hydraulic and pneumatic pressure to said actuating means with the hydraulic pressure greater than the pneumatic pressure; and means for relieving the actuating means of said hydraulic pressure.

6. A dump truck, including: a front wheel assembly; a rear wheel assembly; a tilt frame separate from the front wheel assembly and having the rear end pivoted on the rear wheel assembly, the front end of said frame being adapted for upward tilting movement to a position whereat said frame is downwardly and rearwardly inclined; draft means connecting the frame to the front wheel assembly; hydraulic tilting mechanism connected between the frame and the draft means and arranged to exert a lifting force on the frame thereby causing operation of the draft means to effect relative approaching movement of said wheel assemblies whereby the frame is tilted to said inclined position; a dump body supported for movement longitudinally on the frame; hydraulic and pneumatic actuating means for moving said body rearwardly and forwardly respective to the aft and fore positions; respective means for supplying hydraulic and pneumatic pressure to said actuating means with the hydraulic pressure greater than the pneumatic means; means for relieving the actuating means of said hydraulic pressure; and pneumatic means for releasably latching the body in the fore position, said means being automatic in its latching action.

7. A dump truck, including: a front wheel assembly; a rear wheel assembly; a tilt frame separate from the front wheel assembly and having the rear end pivoted on the rear wheel assembly, the front end of said frame being adapted for upward tilting movement to a position whereat said frame is downwardly and rearwardly inclined; draft means connecting the frame to the front wheel assembly; hydraulic tilting mechanism connected between the frame and the draft means and arranged to exert a lifting force on the frame thereby causing operation of the draft means to effect relative approaching movement of said wheel assemblies whereby the frame is tilted to said inclined position; a dump body supported for movement longitudinally on the frame; hydraulic and pneumatic actuating means for moving said body rearwardly and forwardly respective to the aft and fore positions; a tail gate for said body hinged at its upper end; respective means for supplying hydraulic and pneumatic pressure to said actuating means with the hydraulic pressure greater than the pneumatic means; means for relieving the actuating means of said hydraulic pressure; and pneumatic means for releasably latching the tail gate.

8. A dump truck, including: a front wheel assembly; a rear wheel assembly; a tilt frame separate from the front wheel assembly and having the rear end pivoted on the rear wheel assembly, the front end of said frame being adapted for upward tilting movement to a position whereat said frame is downwardly and rearwardly inclined; draft means connecting the frame to the front wheel assembly; hydraulic tilting mechanism connected between the frame and the draft means and arranged to exert a lifting force on the frame thereby causing operation of the draft means to effect relative approaching movement of said wheel assemblies whereby the frame is tilted to said inclined position; a dump body supported for movement longitudinally on the frame; hydraulic and pneumatic actuating means for moving said body rearwardly and forwardly respectively to the aft and fore positions; a tail gate for said body hinged at its upper end; respective means for supplying hydraulic and pneumatic pressure to said actuating means with the hydraulic pressure greater than the pneumatic pressure; control means for relieving the actuating means of said hydraulic pressure; pneumatic means for latching and unlatching said tail gate; and means for automatically controlling the tail gate latching means whereby the gate will be unlatched when the body moves to its aft position and will be latched when the body moves to its fore position.

9. In dumping mechanism: a frame pivoted at one end and adapted to have the opposite end raised so that said frame will have a downwardly inclined position; fluid pressure actuated means for raising said one end of the frame; a body longitudinally movable on the frame and having fore and aft positions; means for moving said body between said fore and aft positions; and means for controlling the frame raising means and the means for longitudinally moving the body so that said body will be moved to the aft position before the frame raising means raises said one end of the frame, said control means functioning automatically.

10. In a dump truck: a front wheel assembly; a rear wheel assembly; a tilt frame connected to the front wheel assembly and adapted to be tilted on the rear wheel assembly to a position whereat said frame is inclined downwardly and rearwardly; a dump body supported for movement longitudinally on the frame between a fore and aft position; actuator means for moving the body on the frame between said fore and aft positions; tilting mechanism connected to said frame and so constructed and arranged as to exert a lifting force on the frame to effect tilting thereof to said inclined position; and means for automatically controlling the tilting mechanism and actuator means so that the body will be moved to the aft position and the tilting mechanism effects tilting of the frame and the body to said downwardly and rearwardly inclined position.

11. In a dump truck: a front wheel assembly; a rear wheel assembly; a tilt frame connected to the front wheel assembly and adapted to be tilted on the rear wheel assembly to a position whereat said frame is inclined downwardly and rearwardly; fluid pressure actuated tilting mechanism connected to said frame to effect tilting thereof to said inclined position; a dump body supported for movement longitudinally on said frame between a fore and an aft position; actuator means for moving the body on the frame between said fore and aft positions, said actuator means including a cylinder and piston operatively mounted therein and connected between the tilt frame and the body; means for supplying pneumatic pressure to the cylinder at one side of the piston to urge the body forwardly on said frame; means for supplying fluid pressure to the cylinder at the opposite side of said piston to urge the body in the aft direction, said fluid pressure on said opposite side of the piston being greater than said pneumatic pressure and being also supplied to said tilting mechanism; and means for controlling said fluid pressure so that the body will be moved to the aft position before the tilting mechanism effects tilting of the frame and body to said downwardly and rearwardly inclined position.

12. In dumping mechanism: a frame pivoted at one end and adapted to have the opposite end raised so that said frame will have a downwardly inclined position; means for raising said one end of the frame; a body longitudinally movable on the frame and having fore and aft positions; means for moving said body between said fore and aft positions; means for automatically operating the means for longitudinally moving the body and the frame raising means; and means for manually initiating the action of the automatic means.

13. A dump truck, including: a front wheel assembly; a rear wheel assembly; a tilt frame separate from the front wheel assembly and pivoted on the rear wheel assembly for tilting movement from a substantially horizontal position to a downwardly and rearwardly inclined position; draft means connecting the front wheel assembly to the frame; a dump body supported for movement longitudinally on the frame to occupy a fore position and an aft position; body moving means, including actuator means, for moving the body between said fore and aft positions, said means being connected between the tilt frame and said body; tilting mechanism connected between the frame and the draft means, and arranged to exert a lifting force on the frame thereby causing operation of the draft means to produce relative approaching movement of said wheel assemblies whereby the frame is swung to said inclined position, said tilting mechanism being so constructed and arranged as to tilt said frame when the effective weight of the frame on said tilting mechanism is below a predetermined value; and means for controlling said tilting mechanism and said body moving means so that when the tilt frame is horizontal the body will be moved to the aft position to reduce the weight on the tilting mechanism to permit said tilting mechanism to raise said frame and body.

14. A dump truck, including: a front wheel assembly; a rear wheel assembly; a tilt frame pivoted on the rear wheel assembly for tilting movement from a substantially horizontal position to a downwardly and rearwardly inclined position; a dump body supported for movement longitudinally on the frame between a fore position and an aft position; body moving means, including actuator means, for moving the body between said fore and aft positions, said means being connected between the tilt frame and said body; means, including tilting mechanism operably arranged to exert a lifting force on the frame thereby causing relative approaching movement of said wheel assemblies whereby the frame is swung to said inclined position, said tilting mechanism being so constructed and arranged as to tilt said frame when the effective weight of the frame on said tilting mechanism is below a predetermined value; and means for controlling said tilting mechanism and said body moving means so that when the tilt frame is horizontal the body will be moved to the aft position to reduce the weight on the tilting mechanism to permit said tilting mechanism to raise said frame and body.

15. In a dump truck: front and rear wheel assemblies; a tilt frame pivoted for tilting movement from a substantially horizontal position to a downwardly and rearwardly inclined position; a dump body supported for movement longitudinally on the frame between fore and aft positions; body moving means for moving the body between said fore and aft positions; means supplying fluid pressure to said body moving means for urging the body toward the fore position; means for supplying fluid at a greater pressure to said body moving means for urging said body toward the aft position; fluid actuated tilting mechanism arranged to exert a tilting force on the frame whereby the frame is swung to said inclined position, said tilting mechanism being supplied with fluid pressure by the means for supplying the greater fluid pressure; and means for controlling the supply of said greater fluid pressure to said body moving means and said tilting mechanism.

References Cited in the file of this patent

UNITED STATES PATENTS

| 549,954 | Bunnell | Nov. 17, 1895 |
| 577,913 | Chrissinger | Mar. 2, 1897 |
| 1,269,265 | Duggan | June 11, 1918 |
| 1,392,448 | Randall | Oct. 4, 1921 |
| 2,628,126 | Black | Feb. 10, 1953 |
| 2,661,236 | Schonrock | Dec. 1, 1953 |

FOREIGN PATENTS

| 327,392 | Germany | Oct. 11, 1920 |